(12) United States Patent
Banks (10) Patent No.: US 9,096,174 B1
(45) Date of Patent: Aug. 4, 2015

(54) MOTORCYCLE JACKET WITH TURN SIGNALS

(71) Applicant: Daryl L Banks, District Heights, MD (US)

(72) Inventor: Daryl L Banks, District Heights, MD (US)

(*) Notice: Subject to any disclaimer, the term of this patent is extended or adjusted under 35 U.S.C. 154(b) by 269 days.

(21) Appl. No.: 13/855,822

(22) Filed: Apr. 3, 2013

(51) Int. Cl.
*B60Q 1/34* (2006.01)
*G08B 5/00* (2006.01)

(52) U.S. Cl.
CPC *B60Q 1/34* (2013.01); *B60Q 1/343* (2013.01); *G08B 5/006* (2013.01)

(58) Field of Classification Search
None
See application file for complete search history.

(56) References Cited

U.S. PATENT DOCUMENTS

| | | | |
|---|---|---|---|
| 1,209,059 A | 12/1916 | Smith | |
| 3,153,745 A | 10/1964 | Gurian et al. | |
| 4,559,516 A | 12/1985 | Schott et al. | |
| 4,602,191 A | 7/1986 | Davila et al. | |
| 4,709,307 A | 11/1987 | Branom et al. | |
| 5,070,436 A | 12/1991 | Alexander et al. | |
| 5,113,325 A | 5/1992 | Eisenbraun | |
| 5,207,500 A | 5/1993 | Rios et al. | |
| 5,278,734 A | 1/1994 | Ferber | |
| 5,488,361 A | 1/1996 | Perry | |
| 5,613,756 A | 3/1997 | Allen | |
| 5,690,411 A | 11/1997 | Jackman | |
| 6,097,287 A | 8/2000 | Lu | |
| 6,538,567 B2 | 3/2003 | Stewart | |
| 2002/0044052 A1* | 4/2002 | Stewart | 340/475 |
| 2003/0213045 A1* | 11/2003 | Fuentes | 2/69 |
| 2004/0156215 A1* | 8/2004 | Wooldridge | 362/570 |
| 2004/0184262 A1* | 9/2004 | De Silva | 362/108 |
| 2011/0197334 A1* | 8/2011 | Liotta | 2/90 |

FOREIGN PATENT DOCUMENTS

JP   H02-265101 A   10/1990

* cited by examiner

*Primary Examiner* — Brian Zimmerman
*Assistant Examiner* — Laura Nguyen
(74) *Attorney, Agent, or Firm* — Phillip J. Articola; Mots Law, PLLC (57) ABSTRACT

A motorcycle jacket includes a left-turning light provided on an upper-left back portion of the jacket; a right-turning light provided on an upper-right back portion of the jacket, a first sensor provided on a left-side torso portion of the jacket, and a second sensor provided on a right-side torso portion of the jacket. Actuation of the first sensor causes the left-turning light to turn ON. Actuation of the second sensor causes the right-turning light to turn ON.

20 Claims, 5 Drawing Sheets

MOTORCYCLE JACKET WITH TURN SIGNALS

FIELD OF THE INVENTION

This invention relates to a motorcycle jacket with built-in turn signals. The turn signals are enabled by driver action and are not connected to a signaling system of the motorcycle.

BACKGROUND

The visibility of motorcycles on roadways has always been a major problem. One such problem is the limited visibility of a motorcycle's turn signal being activated to indicate a left turn or a right turn to be made by the motorcycle operator. This limited visibility can lead to accidents between motorcyclists and other vehicles on the roadways.

An early attempt to improve the visibility of motorcycle turn indicators is seen in U.S. Pat. No. 1,209,059, issued Dec. 19, 1916, to Smith. A bare bulb, electrically connected to a battery, is attached to the sleeve of a driver, so that when the driver's arm is out of the window making the motions of a turn signal, the light will move with the arm and be visible to other motorists.

Japanese Patent No. JP2265101, issued Oct. 29, 1990 to Hitoshi et al. discloses a jacket with a printed circuit board attached in the middle of its back. A matrix of light emitting diodes (LEDs) are mounted on the printed circuit board which is operationally connected with a motorcycle power source via a programmable operating system. A manipulated graphic with or without text can be displayed on the printed circuit board. The disclosure is very broad with few details, but apparently, when used as a turn signal, a large arrow is formed across the entire board by lighted LEDs, when a turn signal switch is activated by the biker, the arrow pointing in the direction of the turn. While the patentees state that the "turn signal" is activated by a "blinker," it is not clear whether or not the arrow itself flashes on and off. Other displays, such as personal messages, are also programmed into the operating system. The system is expensive, requires separate attachment to the jacket, and the turn signal indication is not the type to which United States drivers are accustomed, opening the possibility that rather than being a clear notification of a turn, it could actually confuse other drivers.

Warning lights, including turn signals, have been placed on motorcycle helmets in U.S. Pat. No. 4,559,516, issued Dec. 17, 1985 to Schott et al., U.S. Pat. No. 5,207,500, issued May 4, 1993 to Rios et al., and U.S. Pat. No. 6,097,287, issued Aug. 1, 2000 to Lu.

The helmet of Schott et al. is self-contained with the battery, switches, circuitry, and lights built-in. The turn signal switches are inertia switches operable by movements of the cyclist's head, a system prone to accidental actuation, for a motorcyclist's head is constantly moving.

Rios et al. include turn signals, a brake light, a tail light, and a head light in their helmet design, making for a large and heavy combination. All of the lights of Rios et al. are powered and actuated by the motorcycle's electrical system. While a multi-lighted helmet is more easily seen by other motorists than one without lights, the light array disclosed by Rios et al. must present a confusing display. The cyclist's head is constantly rotating, thereby constantly changing the position of the left and right turn lights relative to the bike body, which leaves following drivers to wonder what, if anything, is being indicated.

Lu adds to the conventional helmet only a brake light, inductively coupled to the brake system of the motorcycle. No indications of turns are involved.

Safety lights have also been placed on other wearing apparel, to be worn by policemen, joggers, runners, bicyclists, etc., to warn motorists or others in the vicinity of their presence. See U.S. Pat. Nos. 3,153,745; 5,070,436; 5,488,361; and 5,690,411. Only the last, issued Nov. 25, 1997, to Jackman includes manually actuated "turn signals" incorporated into a jogger's vest. They are powered by batteries carried by the wearer.

U.S. Pat. No. 6,538,567 to Stewart describes a motorcycle jacket with turn signals on the back upper left and right portions of the jacket, in which the jacket is electrically connected to an electrical system of the motorcycle. That way, when an operator turns his/her left turn blinker on, the left light on the back upper left portion of the jacket will illuminate, and when the operator turns his/her right turn blinker on, the right light on the back upper right portion of the jacket will illuminate.

Many other lighted apparel have been patented, most for decorative or entertainment purposes. See, for example, U.S. Pat. Nos. 4,602,191; 4,709,307; 5,113,325; 5,278,734; and 5,613,756.

SUMMARY

One innovative aspect of the subject matter described in this specification can be embodied in a motorcycle jacket, which includes a left-turning light provided on an upper-left back portion of the jacket; a right-turning light provided on an upper-right back portion of the jacket; a first sensor provided on a left-side shoulder portion of the jacket; and a second sensor provided on a right-side shoulder portion of the jacket. Actuation of the first sensor causes the left-turning light to turn ON, and actuation of the second sensor causes the right-turning light to turn ON.

Particular embodiments of the subject matter described in this specification can be implemented so as to realize one or more of the following advantages: a) safe operation with respect to enabling a left turn or right turn light on a motorcycle jacket to provide extra visibility with respect to a left turn or a right turn to be performed by the motorcycle operator, b) less complexity with respect to not having to connect the motorcycle jacket's electronics to an electrical system of the motorcycle.

BRIEF DESCRIPTION OF THE DRAWINGS

The details of one or more embodiments of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

The present specification is directed to a motorcycle jacket with turn signals, which is self-contained and does not require connection to an electrical turn system of a motorcycle, and which also allows for enablement of a left turn light or right turn light to be done safely with minimum amount of movement by the motorcycle operator.

Figure 1:
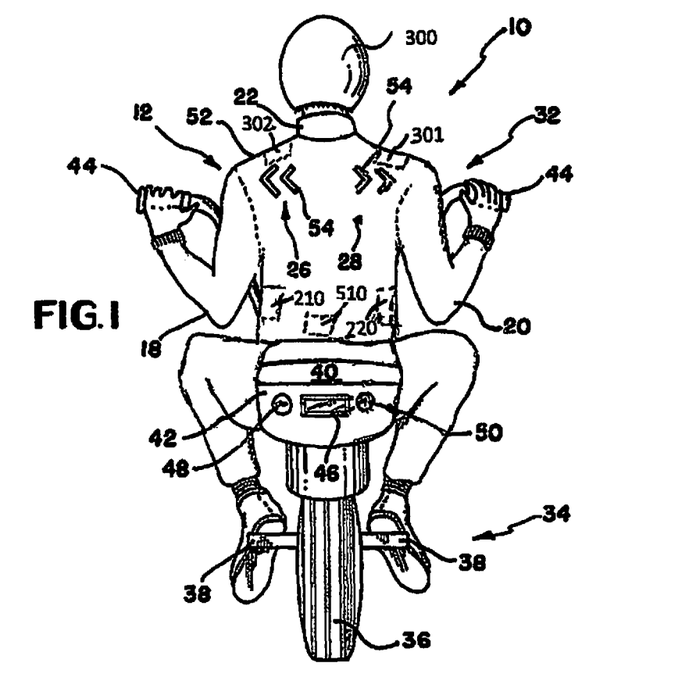
FIG. 1 is a perspective view of the back of a motorcyclist riding on a motorcycle while wearing a motorcycle jacket according to an embodiment.
Figure 2:
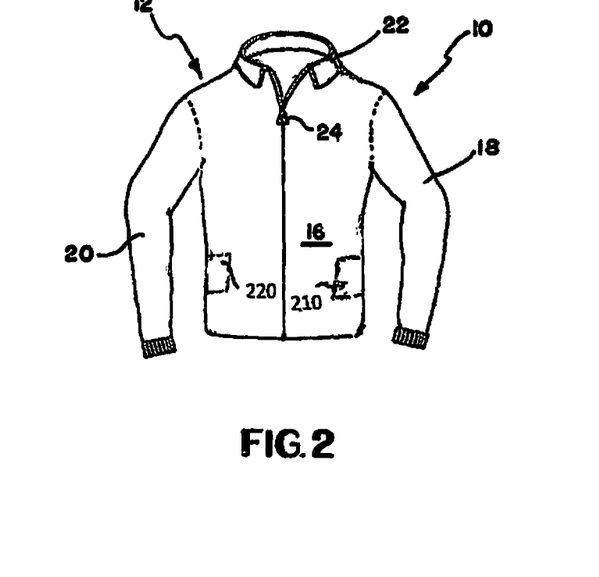
FIG. 2 is a front perspective view of the jacket of FIG. 1.
Figure 3:
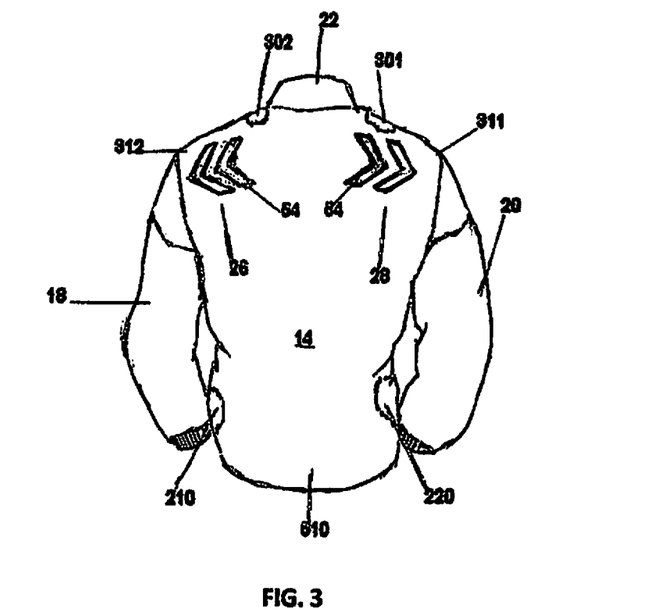
FIG. 3 is a back perspective view of the jacket of FIG. 1.

Referring to FIGS. 1-3, which shows an embodiment, apparel 10 that comprises a jacket 12 having a back 14, a front 16, a pair of sleeves 18 and 20, and a collar 22. Zipper 24 completes a traditional motorcycle jacket. The apparel 10 is outwardly different from a conventional motorcycle jacket only by left and right turn signal indicators 26 and 28. Throughout the specification and claims, the term "jacket" is used in both specific and generic senses, specific to denote the conventional jacket widely known as a "motorcycle jacket" and generically to denote any article of clothing designed to be worn on the torso of a human being, such as a sweater, vest, shirt, T-shirt, tank-top, strap connected front and back panels, a matrix of belts, and a poncho, be them sleeved or sleeveless.

In FIG. 1, a motorcycle rider 32 is riding a motorcycle 34 and signaling for a right turn. Motorcycle 34 can be any well known motorcycle which may be slightly modified in some embodiments to accommodate the invention. Motorcycle 34 comprises a set of wheels 36 (only one of which can be seen), foot rests 38, a seat 40, body 42, handlebars 44, brake light 46, and fixed left and right turn signal lamps 48 and 50. When rider 32 has actuated the right turn signal by means of a switch (not shown) on handlebars 44, right turn signal lamp 50 blinks or flashes, powered by the motorcycle's generator (or battery) and controlled by the motorcycle's flasher circuitry, all of which is conventional and need not be shown.

Back 14 can be visualized as comprising an upper left shoulder area, an upper right shoulder area, and a torso area, which extends below the left and right shoulder areas to the waist of jacket 12. Left and right turn signal indicators 26 and 28 are widely spaced apart on back 14 of jacket 12, optimally positioned in said left and right shoulder areas just below the top of shoulders 52 and just inwardly of sleeves 18 and 20, respectively. This location is the most easily seen by other motorists, especially those driving SUVs, busses, and pick-up trucks, which tend to be seated higher than bikers 32 and can often literally overlook them. The rider's back is naturally rounded in its upper quadrants, so left and right turn signal indicators 26 and 28 are facing slightly upwardly toward higher-situated motorists, making them even more visible. Also, the placement shown is the widest part of the rider's back, thereby spacing them as far apart as is possible under the circumstances for enhanced visibility. Other dispositions may be envisioned while remaining within the spirit and scope of the invention.

Turn signal indicators 26 and 28 are preferably a plurality of arrowhead-shaped lenses 54, each of which have an LED therewithin. As shown, the arrowhead of each lens 54 points either left or right, in the direction of the turn to be indicated. By pointing in their respective directions, left and right turn signal indicators 26 and 28 clearly and unambiguously convey their intended message.

Each lens 54 can be made of a strong, impact resistant plastic with an LED housed therewithin, either by being potted therein or by being removably fit, such as by friction fit or by a screw threaded mount. The lenses 54 can be transparent or translucent, and they can also be tinted red or yellow in accordance with conventional practice concerning automotive turn signal lenses.

In one embodiment, each LED is integrally potted within lens 54 as a single unit which is fixedly mounted to jacket 12 by any convenient method, e.g., adhesives, heat sealing, or stitching. Potted LEDs are so reliable that it is likely the jacket will be worn out or discarded long before left and right turn signal indicators 26 and 28 become inoperative, so making them unitary with jacket 12 at manufacture is a viable option. In this embodiment, jacket 12 presents a solid, moisture resistant exterior which is aesthetically pleasing. In addition, there are no loose parts to possibly separate, break, and/or become lost.

Figure 7:
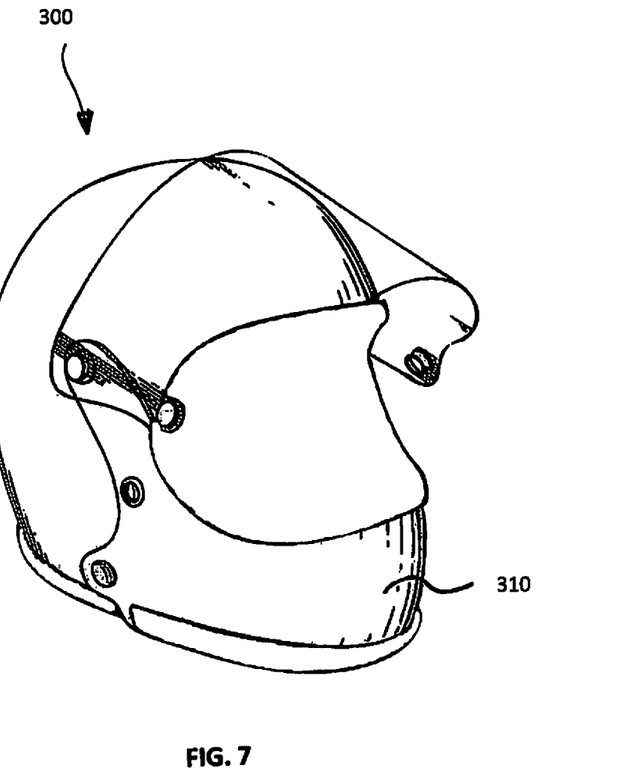
FIG. 7 is a side view of a helmet that may be used by a motorcycle operator according to one or more embodiments.

Referring now to FIGS. 2 and 3 which show one embodiment, and also with reference to FIG. 7, on each side of the jacket 12 there are provided embedded sensors, a left sensor 302 and a right sensor 301. The left sensor 302 and the right sensor 301 may be contact sensors, such as a "push ON/push OFF" switch in which when the button received contact and is depressed, the sensor senses that condition and outputs a signal indicative of that sensing. When the vehicle operator makes contact with the right sensor 301, such as by raising the shoulder of his/her right arm, to make the right shoulder portion 311 of the jacket 12 come in contact with the chin portion 310 of the motorcycle helmet 300 (see FIG. 7), the right sensor 301 will detect that contact and will enable actuation of the right turn signal 28 (see also FIG. 1). When the vehicle operator makes contact with the left sensor 302, such as by raising the shoulder of his/her left arm to make the left shoulder portion 312 of the jacket 12 come in contact with the chin portion 310 of the motorcycle helmet 300, the left sensor 302 will detect that contact and will enable actuation of the left turn signal 26 (see also FIG. 4, which shows a "motorcycle vest" embodiment).

In some other implementations, the left sensor 302 and the right sensor 301 may be proximity sensors, which can detect proximity to another object, in this case proximity to a chin portion of a helmet. The proximity sensors can detect being within a particular distance, say, for example, within 1 cm of a plastic material, such as a polycarbonate plastic material, which most helmet shells are currently made of. The change in magnetic field or electric field of the proximity sensor due to being in close proximity to a plastic material is detected and is what causes the proximity sensor to output a signal indicating that condition.

In some embodiments, the left and right sensors 302, 301 may be disposed between the outer portion of the jacket 12 and the inner liner of the jacket 12, to provide protection for the sensors 301, 302. The inner liner of the jacket 12 may have a zipper portion to allow it to be removed from the jacket 12, and in that case the sensors 302, 301 are disposed on an inside surface of the torso-covering portion of the jacket 12, between the outer surface of the jacket 12 and the torso of the wearer of the jacket 12.

In some embodiments, in order to turn off the turn signal light, the vehicle operator makes another contact to the left or right sensor (depending upon which turn signal light is currently activated) by raising the shoulder of his/her left or right arm, to make the left or right shoulder portion of the jacket 12 come in contact with the chin portion 310 of the motorcycle helmet 300. In other embodiments, the turn signal light turns off automatically at a predetermined time after it has been activated, such as a time between 3 and 5 seconds after activation. In these other embodiments, the extra vehicle operator movement of his/her shoulder against the chin portion 310 of the motorcycle helmet 300 to cause the turn signal light to turn off is not required.

To assist the vehicle operator in determining whether another operator action is needed, a sound device (not shown) may be included within the lining of the jacket 12, which makes a turn signal sound (e.g., click, click, click, etc.) while the turn signal light is activated, so that the vehicle operator can then realize that he/she should turn off the turn signal indicator 26, 28 after having made a turn on a road. When the turn signal indicator 26, 28 is turned off by way of another movement made by the vehicle operator (see description above regarding shoulder sensor contact with helmet chin portion, or see description below regarding torso sensor contact with elbow), the sound device turns off the sound.

Not shown in FIGS. 2 and 3 is the connection between the left sensor 302 and the left turn signal indicator 26, and the connection between the right sensor 304 and the right turn signal indicator 28. In some embodiments, these connections are made by a wired connection, and in some other embodiments, these connections are made by a wireless connection, in which case a wireless signal is output by the left sensor 302 when it detects contact being made to it, which is then received by the left turn signal indicator 26 to cause the left turn signal indicator 26 to changes its state (i.e., to turn ON from a current OFF state, or to turn OFF from a current ON state).

In the wireless embodiments, a first wireless transmitting device is electrically connected to the left sensor 302 and a second wireless transmitting device is electrically connected to the right sensor 304. When contact is made by the first wireless transmitting device with the chin portion 310 of the motorcycle helmet 300, the first wireless transmitting device outputs a wireless signal that is received by a first wireless receiving device that is electrically connected to the left turn signal indicator 26, thereby causing the left turn signal indicator 26 to flash intermittently (e.g., turn ON). When contact is made by the second wireless transmitting device with the chin portion 310 of the motorcycle helmet 300, the second wireless transmitting device outputs a wireless signal that is received by a second wireless receiving device that is electrically connected to the right turn signal indicator 28, thereby causing the right turn signal indicator 28 to flash intermittently (e.g., turn ON).

In cases where the vehicle operator is not wearing a motorcycle helmet or is wearing a motorcycle helmet that does not have a chin portion, contact between the left and right sensors and an actual chin region of the motorcycle operator is what is to be detected by the left and right sensors, to cause the turn signal indicators to change their respective states. A resistive sensor may be included to detect contact with the skin of the motorcycle operator, in which a particular indicative of contact with human skin (e.g., 100 to 200 ohms) can be used to detect such contact.

Referring again to FIGS. 2 and 3, on each side of the jacket 12 there are additional embedded sensors, a left sensor 210 and a right sensor 220. When the vehicle operator makes contact with the right sensor 220, such as by turning the elbow of his/her right arm, which is covered by the right arm 20 of the jacket 12, against the right side torso-covering portion 230 of the jacket 12, the right sensor 220 will detect that contact and will enable actuation of the right turn signal 28 (see also FIG. 1). When the vehicle operator makes contact with the left sensor 210, such as by turning the elbow of his/her left arm, which is covered by the left arm 18 of the jacket 18, against the left side torso-covering portion 240 of the jacket 12, the left sensor 210 will detect that contact and will enable actuation of the left turn signal 26 (see also FIG. 4, which shows a "motorcycle vest" embodiment).

In some embodiments, the left and right sensors 210, 220 may be disposed between the outer portion of the jacket 12 and the inner liner of the jacket 12, to provide protection for the sensors 210, 220. The inner liner of the jacket 12 may have a zipper portion to allow it to be removed from the jacket 12, and in that case the sensors 210, 220 are disposed on an inside surface of the torso-covering portion of the jacket 12, between the outer surface of the jacket 12 and the torso of the wearer of the jacket 12.

In some embodiments, only the shoulder sensors 301, 302 are provided on the jacket 12, whereby the torso sensors 210, 220 are not provided thereon. In other embodiments, only the torso sensors 210, 220 are provided on the jacket 12, whereby the shoulder sensors 301, 302 are not provided thereon. In yet other embodiments, both the shoulder sensors and the torso sensors are provided on the jacket 12, to provide the vehicle operator with two different ways to turn on or off the turn signal indicators 26, 28 (the first way by a shoulder shrug against the chin portion of the helmet of the operator's chin, the second way by a right or left elbow contact with the right or left torso sensor).

Figure 5:
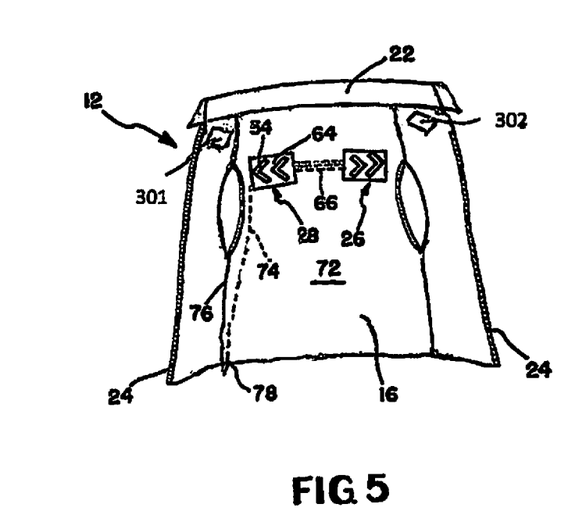
FIG. 5 is a perspective view of the opened front of either of the jackets of FIGS. 1 and 3, respectively.

FIG. 5 shows an inner portion of the jacket 12. The left-side sensor 210 is disposed in a middle region of the left-side torso-covering portion 230 (with respect to a height of a torso portion of the jacket 12), at a location whereby a left arm elbow typically makes contact when moved against a person's torso. The right-side sensor 220 is disposed in a middle region of the right-side torso-covering portion 240, at a location whereby a right arm elbow typically makes contact when moved against a person's torso. Also shown in FIG. 5 is the location of the left shoulder sensor 302 and the right shoulder sensor 301.

A battery pack is provided within the jacket 12, and can be located in any convenient area. FIG. 5 shows a battery pack 510 disposed in a lower back portion 520 of the jacket 12, in which the battery pack 510 may include a Velcro™ portion 530 to allow for it to be exposed to the exterior, in cases where the battery pack 510 needs to be changed. For example, the motorcycle operator can install a new battery into the battery pack 510 when the turn signals click more slowly than usual. In these embodiments, the turn signals include a clicking sound that mimics the on-off of the turn signals, whereby the motorcycle operator can listen to the clicking sound and determine if it is getting slower than usual, thereby requiring a replacement battery in the battery pack 510. Not shown in FIG. 5 is the power line connections between the battery pack 510 and the sensors, whereby these connections may be via appropriately gauged wires disposed within the lining of the jacket 12 that connect the battery pack 510 to the sensors.

In other embodiments, the battery pack 510 is disposed on the left-side portion or the right-side portion of the jacket 12, such as a location at the bottom back portion of the jacket 12. In yet other embodiments, a small solar panel is provided on the top portion of the jacket 12 (e.g., is sewn on the left and/or right shoulder portion of the jacket 12), which receives energy from the sun in order to provide power to the sensors. This can be used in concert with, or as a replacement for the battery pack 510 configuration.

Figure 6:
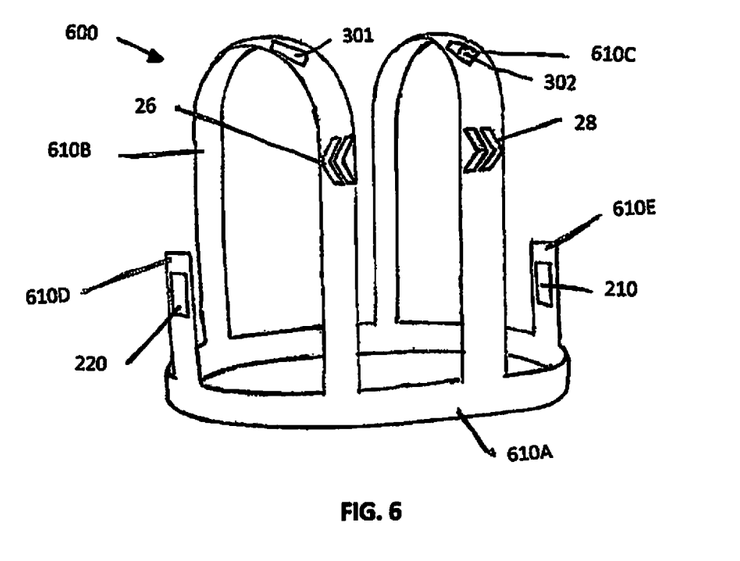
FIG. 6 is a perspective view of a removably attachable turn signal apparatus for attachment to a motorcycle vest or jacket, according to an embodiment.

In other embodiments, as shown in FIG. 6, the light signaling elements are removably attached to a normal motorcycle jacket by a removably-attachable light turn apparatus 600, to provide for a motorcycle jacket with turn signals. The light signaling elements can be Velcro'ed onto a normal motorcycle jacket by way of Velcro portions 610, in which one Velcro™ portion 610A fits around the waist of the wearer of the jacket 12 in a horizontal manner, and where other Velcro™ portions 610B, 610C fit over the torso of the wearer of the jacket 12 in a vertical manner, in a manner similar to wearing braces instead of a belt. The shoulder sensors 301, 302 and the torso sensors 210, 220 are provided at the appropriate locations on the Velcro™ portions, whereby the shoulder sensors 301, 302 detect contact with a helmet chin portion or an operator's chin, and whereby the torso sensors 210, 20 detect contact with an elbow of the operator. Like the embodiments described previously, the connections between the sensors 301, 302, 210, 220 and the turn signal indicators 26, 28 may be wired connections or by wireless connections.

In some embodiments, the Velcro™ portions are light-reflecting to provide for additional visibility for the motorcycle operator. In FIG. 6, the vertical left Velcro portion 6108 contains the left side turn signal 26, and the vertical right Velcro portion 610C contains the right side turn signal 28. A Velcro™ strip 610D fits between the inside lining of the jacket 12 and the left side torso of the vehicle operator, and includes a left side sensor 210 disposed thereon. A Velcro™ strip 610E fits between the inside lining of the jacket 12 and the right side torso of the motorcycle operator, and includes a right side sensor 220 disposed thereon. The top portions of the Velcro™ strips 610D, 610E can be removably attached to the inner lining of the jacket on which the removably-attachable light turn apparatus 600 is attached, such as by Velcro™ hook-and-loop attachment. For example, the top portion of the Velcro™ strips 610D, 610E can include Velcro™ hook regions, and the inside lining of the jacket 12 on the left and right sides can have Velcro™ loop regions for removably connecting with the Velcro hook regions of the Velcro™ strips 610D, 610E. In alternative implementations, other types of hook-and-loop fasteners besides Velcro™ can be utilized in some embodiments.

A battery pack (and/or solar panel) for providing power to enable the left and right turn signals and the left and right sensors can be provided on any of the Velcro™ strips, or on another Velcro™ strip (e.g., another vertically-positioned Velcro™ strip).

In a manner similar to operation of previously-described embodiments, when the motorcycle operator makes contact to the left side sensor, such as by contacting his/her left elbow against the left side torso portion of the jacket 12, that is detected by the sensor, which causes the left side turn signal 26 to turn ON. When the motorcycle operator makes contact to the right side sensor, such as by contacting his/her right elbow against the right side torso portion of the jacket 12, that is detected by the sensor, which causes the right side turn signal 26 to turn ON.

When the motorcycle operator is finished with his/her motorcycle ride, the motorcycle operator can then easily remove the Velcro™ portions from the jacket 12, to turn the jacket 12 back into a normal motorcycle jacket.

Figure 4:
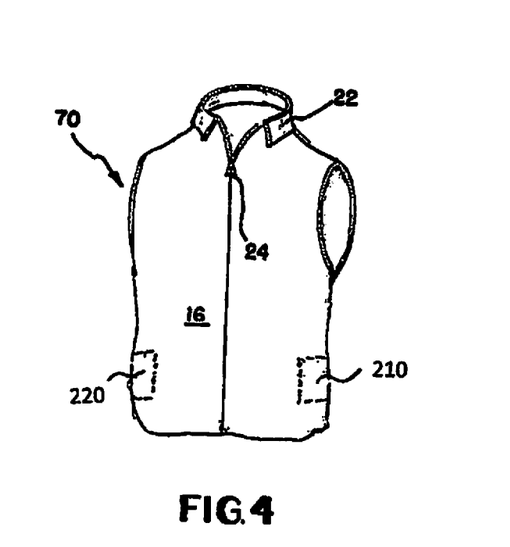
FIG. 4 is a front perspective view of a motorcycle vest according to an embodiment.

In other embodiments, the jacket 12 may be a sleeveless jacket or vest, in which the operation of the lights on the jacket 12 is the same as described above with respect to the arm-covering jacket of FIG. 1. FIG. 4 shows a sleeveless vest 70 that can accommodate the left and right turn signals in accordance with an embodiment. The vest 70 includes a collar portion 22, and a front zipper 24. Left and right turn signals, left and right sensors, and a battery pack can provided on the vest 70 in a manner similar to what is shown in FIGS. 1-3 and 5.

Returning to FIG. 1, right turn indicator 28 is shown flashing in synchronism with the flashing of right turn signal lamp 50. If the driver trailing the motorcycle can see only turn indicator 28, turn signal 50 being obscured by a portion of his vehicle or other object, he/she will be made aware of the biker's intention to turn by the flashing turn indicator on jacket 12, an awareness not afforded without use of a jacket according to an embodiment. If the driver trailing the motorcycle can see both, the fact that they are flashing together further emphasizes that it is a turn that is being indicated, and not just decorative lights flashing randomly on and off.

The left and right turn signal indicators 26 and 28 may be the only lights provided on the back of jacket 12, at least in the upper, outer shoulder areas. Other lights, and even reflective material, can mask or detract from the visibility of left and right turn signal indicators 26 and 28, thereby decreasing their effectiveness as turn signals, and so the inclusion of other lights on the back of the jacket 12 can be made but is not optimal. Indicia, such as logos, advertising, company or club affiliations, etc., which are printed on back 14 centrally thereof will not usually interfere with the readability of left and right turn signal indicators 26 and 28, and their presence is not excluded in embodiments described herein. Other lighting utilized as a part of jacket 12 may be used with care, balancing their desired decorative value against the enhanced safety function of left and right turn signal indicators 26 and 28.

FIG. 7 shows a perspective view of a helmet 300, which shows the chin portion 310 of the helmet by which the shoulder sensors 301, 302 can make contact with (or being in proximity to for the implementations having proximity sensors) in order to change a state of the turn signal indicators 26, 28.

By providing enablement of a left-turn signal or a right-turn signal on the back of the motorcycle jacket by a simple manipulation of a left arm or a right arm of the motorcycle operator, this results in a safe operation of the turn signaling operation, without requiring a head-turning maneuver or other type of maneuver that may result in an unsafe motorcycle driving state.

The turn signal jacket according to one or more embodiments is virtually indistinguishable from conventional jackets in appearance and weight. Each turn signal indicator 26 and 28 can be very light, weighing but a few ounces. The sensors and battery pack attached to the inner lining of the jacket can also be fairly light. The difference in weight is fairly negligible.

In other embodiments, a wireless transmitter device is electrically connected to the left turn signal electronics on the motorcycle (there may be provided one wireless transmitter device for the left turn signal electronics and one wireless transmitter device for the right turn signal electronics in some implementations), which outputs a wireless signal to a wireless receiver device provided on a motorcycle jacket (there may be provided one wireless receiver device for the left turn signal indicator 26 and one wireless transmitter device for the right turn signal indicator 28 in some implementations). The wireless receiver device is electrically connected to the turn signal indicators 26, 28 on the back of the motorcycle jacket, in which the turn signal indicators 26, 28 are turned ON and OFF when the motorcycle turn signal is turned ON and OFF. That way, irrespective as to when a motorcycle operator uses his/her motorcycle jacket to turn ON or OFF the turn signal indicators 26, 28 on his/her jacket, those turn signal indicators 26, 28 are turned ON and OFF at the same time the turn signal lights 48, 50 of the motorcycle are turned ON and OFF. In some implementations, the wireless transmitter device may be housed within the seat of the motorcycle, and connected to the motorcycle turn signal electronics that are also housed within the seat of the motorcycle. The wireless receiver device may be sewn onto the motorcycle jacket, similar to how the sensors and turn signal indicators are sewn onto the motorcycle jacket.

Figure 8:
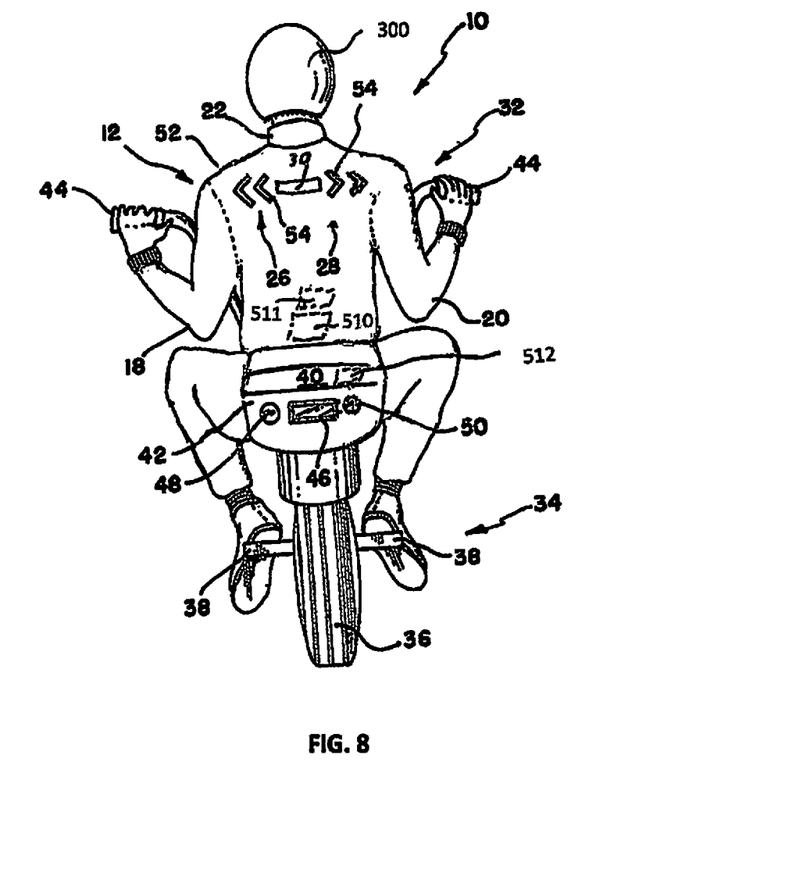
FIG. 8 is a perspective view of the back of a motorcyclist riding on a motorcycle while wearing a motorcycle jacket according to another embodiment.

FIG. 8 shows an implementation of the embodiment described above. In this implementation, brake and turn signals of the motorcycle 34 are sent via wireless transmission and reception to electronics on the motorcycle jacket 12, which in turn cause the respective lights on the back of the motorcycle jacket 12 to turn ON at appropriate times. A wireless transmitter 512 is provided within the motorcycle seat 40, where motorcycle wiring electronics are typically housed. The wireless transmitter 512 is coupled to left turn signal wiring, right turn signal wiring, and brake signal wiring within the motorcycle seat 40. When a particular signal is detected by the wireless transmitter 512, such as a brake signal carried on the brake signal line within the motorcycle seat 40, the wireless transmitter 512 outputs a wireless signal indicative of the brake light being activated on the motorcycle 34. The wireless signal is picked up by a wireless receiver 510 provided within the motorcycle jacket 12 (e.g., sewn into the jacket 12, similar to how the other components described with respect to previous embodiments are housed in the jacket 12). The wireless receiver 510 is electrically connected to the various light components (e.g., left turn LED 26, right turn LED 28, and brake light LED 30) disposed on the upper back portion of the motorcycle jacket 12, and causes the appropriate light to be activated (e.g., turned ON) due to receipt of a signal output by the wireless transmitter 512. The communications between the wireless transmitter 512 and the wireless receiver 510 may be accomplished by an appropriate wireless communications protocol, such as Bluetooth™ that is used for wireless communications between devices that are disposed nearby each other (e.g., within 5-10 feet of each other).

In the above-described embodiment, the lights on the back of the motorcycle jacket 12 are activated based on signals on brake and/or turn signal wiring of the motorcycle 34, and not based on particular physical movements (e.g., shrugging the shoulder portion of the motorcycle jacket 12 to contact with a chin portion 310 of a helmet 300), and in this regard is different from the other described embodiments. Like the other embodiments, wiring between the motorcycle jacket 12 and the electronics of the motorcycle 34 is not utilized to cause activation of the appropriate LEDs on the back of the motorcycle jacket 12. Rather, a wireless signaling scheme is utilized. A removable jacket overlay structure, such as shown in FIG. 6, can also be utilized in this embodiment, in order to provide the appropriate lights on the jacket overlay structure to be turned on based on detection of an appropriate signal (e.g., brake light activation, left turn signal activation, right turn signal activation) detected from the motorcycle signal electronics housed within the motorcycle seat 40. The brake light may be provided on the first strap 610A, between the left turn signal light 26 and the right turn signal light 28, or there may be provided another strap (not shown in FIG. 6) that is provided between the left turn signal light 26 and the right turn signal light 28, on which a brake light indicator is provided (so as to have a similar disposition of lights on the back of the motorcycle jacket 12 such as shown in FIG. 8).

In yet another implementation of a wireless embodiment, the motorcycle helmet 300 is provided with a left turn signal indicator (e.g., similar in shape to the indicator 26 shown in FIG. 1) provided on a back left side of the motorcycle helmet 300, and a right turn signal indicator (e.g., similar in shape to the indicator 28 shown in FIG. 1) provided on a back right side of the motorcycle helmet 300. These indicators 26, 28 can be removably affixed to the motorcycle helmet 300 in any of a variety of ways, such as by using VELCRO strips, double-sided tape, etc. When the wireless transmitter 512 disposed within the seat of the motorcycle 34 outputs a left turn signal indication, the wireless receiver 510 provided within the motorcycle jacket 12 picks up that signal and causes the left turn signal indicator on the back left side of the motorcycle helmet 300 to illuminate (e.g., flash ON and OFF at a one second interval for a period of five seconds). Similarly, when the wireless transmitter 512 disposed within the seat of the motorcycle 34 outputs a right turn signal indication, the wireless receiver 510 provided within the motorcycle jacket 12 picks up that signal and causes the right turn signal indicator on the back right side of the motorcycle helmet 300 to illuminate (e.g., flash ON and OFF at a one second interval for a period of five seconds). That way, another vehicle sharing the road with the motorcycle 34 is made even more aware of an upcoming turn to be made by the motorcycle operator 32 due to an appropriate light flashing on the back portion of the motorcycle helmet 300.

In yet another possible embodiment, instead of having a wired connection of the brake signal to a wireless transmitter 512 housed within the seat of the motorcycle 34, an accelerometer can be provided on the motorcycle 34, such as within the seat of the motorcycle 34 or on another part of the motorcycle 34. When the accelerometer detects a slowing down of the motorcycle (e.g., a slowing down by more than a predetermined rate of slowing down), which would occur due to a brake applied by the motorcycle operator 32, the accelerometer detects that slowing down, and outputs a signal to the wireless transmitter 512, which in turn sends out a signal to the wireless receiver 510 provided on the motorcycle jacket 12, which in turn causes the brake light LED 30 on the back of the motorcycle jacket 12 to turn on.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:
1. A motorcycle jacket, comprising:
   a left-turning light provided on an upper-left back side of the jacket;
   a right-turning light provided on an upper-right back side of the jacket;
   a first sensor provided on a left side of the jacket; and
   a second sensor provided on a right side of the jacket,
   wherein actuation of the first sensor causes the left-turning light to turn ON, and
   wherein actuation of the second sensor causes the right-turning light to turn ON,
   wherein the first sensor is positioned a predetermined distance directly below a region of the jacket that is fitted to a left armpit of a wearer of the jacket, in which a first portion of the first sensor is provided on a front side of the jacket and in which a second portion of the first sensor is provided on a back side of the jacket, to allow for hands-free actuation of the first sensor by the wearer of the jacket, and wherein the second sensor is positioned a predetermined distance directly below a region of the jacket that is fitted to a right armpit of the wearer of the jacket, in which a first portion of the second sensor is provided on the front side of the jacket and in which a second portion of the second sensor is provided on the back side of the jacket, to allow for hands-free actuation of the first sensor by the wearer of the jacket.

2. The motorcycle jacket according to claim 1, further comprising a third sensor that is positioned on a portion of the jacket that is worn over a left-side collarbone of the wearer of the jacket.

3. The motorcycle jacket according to claim 2, further comprising a fourth sensor that is positioned on a portion of the jacket that is worn over a right-side collarbone of the wearer of the jacket.

4. The motorcycle jacket according to claim 3, wherein the fourth sensor is a proximity sensor which is activated when then chin portion of the motorcycle helmet worn by the wearer of the jacket is moved to within a predetermined distance of the fourth sensor.

5. The motorcycle jacket according to claim 3, wherein the fourth sensor is a resistive sensor which is activated when the chin region of the wearer of the jacket makes contact with the second sensor, thereby causing the fourth sensor to detect an ohmic level within the predetermined range indicative of contact with skin.

6. The motorcycle jacket according to claim 2, wherein the third sensor is a proximity sensor which is activated when a chin portion of a motorcycle helmet worn by the wearer of the jacket is moved to within a predetermined distance of the third sensor.

7. The motorcycle jacket according to claim 6, wherein the third sensor detects a change in a magnetic field or electric field due to the chin portion of the motorcycle helmet worn by the wearer of the jacket being within the predetermined distance of the third sensor.

8. The motorcycle jacket according to claim 2, wherein the third sensor is a resistive sensor which is activated when a chin region of the wearer of the jacket makes contact with the third sensor, thereby causing the third sensor to detect an ohmic level within a predetermined range indicative of contact with skin.

9. The motorcycle jacket according to claim 1, further comprising:
a sound device embedded within the jacket, wherein the sound device outputs an audible sound when one of the first sensor and the second sensor is activated, to thereby indicate to the motorcycle operator that one of the left-turning light and the right-turning light on the jacket has been turned on.

10. The motorcycle jacket according to claim 9, further comprising:
a battery pack provided on the jacket,
wherein the sound device outputs the audible sound as a plurality of periodic clicking sounds, and
wherein a slowing down of a periodicity of the clicking sounds provides an indication that the battery pack is losing power and needs to be replaced.

11. The motorcycle jacket according to claim 1, wherein the left-turning light and the right-turning light are removably attached to the back side of the jacket.

12. The motorcycle jacket according to claim 1, further comprising:
a battery pack provided on the jacket; and
a solar panel provided on the jacket,
wherein the solar panel is electrically connected to the battery pack and provides power to the battery pack due to sun rays being incident on the solar panel.

13. The motorcycle jacket according to claim 1, further comprising:
a battery pack provided on the jacket; and
a solar panel provided on the jacket,
wherein the solar panel provides power obtained from sun rays being incident on the solar panel directly to the first and second lights.

14. The motorcycle jacket according to claim 1, further comprising:
a wireless receiver provided on the jacket and configured to receive a first indication output from a wireless transmitter provided within the motorcycle that a right-turn signal light on the motorcycle has been actuated, and configured to receive a second indication output from the wireless transmitter provided within the motorcycle that a left-turn signal light on the motorcycle has been actuated,
wherein the right-turning light on the jacket is actuated as a result of reception by the wireless receiver of the first indication, and
wherein the left-turning light on the jacket is actuated as a result of reception by the wireless receiver of the second indication.

15. The motorcycle jacket according to claim 14, wherein the wireless receiver causes a first light element provided on a back right portion of a motorcycle helmet provided within a predetermined distance of the wireless receiver to turn on based on reception of the first indication by the wireless receiver, and
wherein the wireless receiver causes a second light element provided on a back left portion of a motorcycle helmet provided within a predetermined distance of the wireless receiver to turn on based on reception of the second indication by the wireless receiver.

16. The motorcycle jacket according to claim 1, further comprising a wireless unit configured to receive first and second signals output from the motorcycle, the first signal received by the wireless unit causing the left-turning light to turn ON, and the second signal received by the wireless unit causing the right-turning light to turn ON.

17. A turn signal attachment device for a motorcycle jacket, comprising:
a first strap for attachment around a waist of an operator wearing the motorcycle jacket;
a second strap that is vertically disposed with respect to the first strap and which attaches at one end to a back of the first strap and which attaches at another end to a front of the first strap, the second strap configured to wrap over the motorcycle jacket on a left side portion of the motorcycle jacket;
a third strap that is vertically disposed with respect to the first strap and which attaches at one end to a back of the first strap and which attaches at another end to a front of the first strap, the third strap configured to wrap over the motorcycle jacket on a right side portion of the motorcycle jacket,
wherein the second strap includes a first light which indicates a left turn of the motorcycle when illuminated,
wherein the third strap includes a second light which indicates a right turn of the motorcycle when illuminated,
wherein the second strap includes a first sensor provided on a top-most portion of the second strap furthest away from the first strap, so as to be worn over a left-side collarbone of a wearer of the attachment device, in which actuation of the first sensor causes the first light to turn on from an off state, the first sensor positioned so as to allow for hands-free actuation of the first sensor by the wearer of the jacket, and wherein the third strap includes a second sensor provided on a top-most portion of the third strap furthest away from the first strap, so as to be worn over a right-side collarbone of the wearer of the attachment device, in which actuation of the second sensor causes the second light to turn on from an off state, the second sensor positioned to allow for hands-free actuation of the second sensor by the wearer of the jacket.

18. The attachment device according to claim 17, further comprising:

a fifth strap extending upward from the first strap to abut a left-side torso portion of the wearer of the attachment device;

a sixth strap extending upward from the first strap to abut a right-side torso portion of the wearer of the attachment device, a third sensor provided on the fifth strap for receiving contact from a left elbow of the wearer of the attachment device, so as to cause the first light to turn on from an off state, and a fourth sensor provided on the sixth strap for receiving contact from a right elbow of the wearer of the attachment device, so as to cause the second light to turn on from an off state.

19. A motorcycle vest, comprising:

a left-turning light provided on an upper-left back side of the vest;

a right-turning light provided on an upper-right back side of the vest;

a first sensor provided on a left side of the vest; and a second sensor provided on a right side of the vest, wherein actuation of the first sensor causes the left-turning light to turn ON, and wherein actuation of the second sensor causes the right-turning light to turn ON, wherein the first sensor is positioned a predetermined distance directly below a region of the vest that is fitted to a left armpit of a wearer of the vest, in which a first portion of the first sensor is provided on a front side of the vest and in which a second portion of the first sensor is provided on a back side of the vest, to allow for hands-free actuation of the first sensor by the wearer of the vest, and wherein the second sensor is positioned a predetermined distance directly below a region of the vest that is fitted to a right armpit of the wearer of the vest, in which a first portion of the second sensor is provided on the front side of the vest and in which a second portion of the second sensor is provided on the back side of the vest, to allow for hands-free actuation of the first sensor by the wearer of the vest.

20. The motorcycle vest according to claim 19, further comprising:

a third sensor that is positioned on a portion of the vest that is worn over a left-side collarbone of the wearer of the vest; and a fourth sensor that is positioned on a portion of the vest that is worn over a right-side collarbone of the wearer of the vest.

\* \* \* \* \*